June 3, 1952     I. A. FARNWORTH     2,599,377
AUTOMATIC TRAVEL ADJUSTER FOR AIR BRAKE PISTONS

Filed March 24, 1948     7 Sheets-Sheet 1

Inventor

Ivan A. Farnworth

By *Clarence A. O'Brien and Harvey B. Jacobson*
Attorneys

June 3, 1952     I. A. FARNWORTH     2,599,377
AUTOMATIC TRAVEL ADJUSTER FOR AIR BRAKE PISTONS
Filed March 24, 1948     7 Sheets-Sheet 7

Ivan A. Farnworth
INVENTOR.

Patented June 3, 1952

2,599,377

UNITED STATES PATENT OFFICE 2,599,377

AUTOMATIC TRAVEL ADJUSTER FOR AIR BRAKE PISTONS

Ivan A. Farnworth, Orem, Utah

Application March 24, 1948, Serial No. 16,668

12 Claims. (Cl. 188—200)

This invention comprises novel and useful improvements in an automatic travel adjuster for air brake pistons and more specifically pertains to a mechanism for automatically maintaining an adjustment of the linkage connecting an air brake piston with the brake mechanism for causing actuation of the brakes during a predetermined portion of the air brake piston travel.

The principal object of this invention therefore is to automatically adjust the length of the connecting linkage between the air-operated brake-actuating piston and the brake rigging in accordance with either wear in the brake rigging or brake shoes, or increased thickness of new shoes when installed, so that the brake-applying stroke of the said actuating piston will be maintained substantially continuously at a given length.

An important object of the invention is to automatically adjust the air brake piston travel, as set forth in the preceding object, by and during the brake applying movement of the brake system.

Still another object is to individually and independently adjust the brakes of each car or other vehicle unit and thus maintain the same effective brake pressure and action on each in conformity with the foregoing objects.

A still further object is to provide a brake adjusting mechanism according to the foregoing objects for obviating the necessity for manually and laboriously adjusting the brake rigging, especially when new brake shoes are installed or as wear occurs in said shoes or the rigging.

In general, the invention is concerned with so altering the conventional brake-operating mechanism that slack due to wear in the brake rigging or of the brake shoes will be automatically taken up as and when it occurs, and that, upon the installation of new brake shoes the increased thickness thereof will be automatically accommodated, to the end that the actuating stroke of the air-operated piston will be maintained at a constant length.

In accordance with the presently preferred embodiment of the invention adapted for installation in connection with existing air-brake equipment in railroad rolling stock, the connecting rod between the air-operated piston and the brake rigging is made up of two independent rod members which are normally joined by a ratchet coupling to form, in effect, an elongate element rigid in the direction of brake application. The piston is fixed to an end of one of the rod members and the pawl of the ratchet coupling to the other end. The other rod member is formed as a ratchet bar over which the pawl is arranged to operate, and is connected to the brake rigging. A limit arm is fixed to the ratchet bar and extends into engagement with the carriage of a positioning device, being slidable within such carriage between two abutment members, one of which is movable to a position establishing a maximum spacing between abutment members equal to the normal length of the brake-applying stroke of the ratchet bar. The positioning device includes a ratchet arrangement, which permits brake-applying travel of the carriage in company with the connecting rod members aforesaid, but prevents travel of the carriage in the opposite direction, whereby return of the ratchet bar from any brake-applying position is limited, in instances where the brake-applying stroke is normal or too long, to the maximum spacing between abutment members. A resilient arrangement is provided to return the ratchet bar the limited extent permitted, while the usual return spring associated with the piston serves to return the piston and its connecting rod member to their original positions, the pawl riding over the ratchet bar during such return to accomplish the required elongation of the connecting rod arrangement, so that the next brake-applying stroke of the piston will be one of normal length.

A latch normally maintains ratchet operation for the ratchet arrangement of the positioning device, but a latch release is provided, together with actuating means therefor which is placed in proper operative position by the return movement of the piston-carrying connecting rod member from those brake-applying positions involving an abnormally short brake-applying stroke, as when new brake shoes have been installed. The next brake-applying stroke of the piston causes the actuating means to actuate or trip the latch release. Such actuation of the latch release brings about ratchet disengagement of the aforesaid ratchet arrangement, and a propulsion device acts to move the carriage in its normally locked direction to carry the ratchet bar through an extended return travel, thereby shortening the connecting rod arrangement, so that the next brake-applying stroke of the piston will be of normal length. A clutch arrangement maintains the pawl disengaged from the ratchet bar so the aforesaid extended return travel of the ratchet bar can be accomplished.

Accordingly, a feature of the invention resides in the provision of an extensible and retractible connecting rod arrangement between the fluid-operated piston and the brake mechanism in a fluid-operated brake system; and a movable positioning device embodying a travel-way of constant given length representing the length of a normal brake-applying stroke, the positioning device being so constructed and arranged and so associated with the connecting rod arrangement as to move therewith in the brake-applying stroke, and to, in effect, both measure and apply the correction in length of such connecting rod arrangement necessary for proper adjustment of the system.

A further feature is the provision for normally locking the positioning device against movement in the direction of return of the piston and connecting rod arrangement from brake-applying position, except when the brake-applying stroke is excessively short as when new brake shoes have been applied.

These, together with various ancillary features and objects of the invention which will be later set forth in the accompanying specification, are attained by the present device, a preferred embodiment of which has been illustrated by way of example only in the accompanying drawings, wherein:

Reference is now made more particularly to the accompanying drawings, wherein like numerals designate similar parts throughout the various views. Attention is first directed to Figure 1, wherein 10 designates a conventional type of air brake cylinder for operating an air brake system, such as employed for railway cars, it being understood that the principles of the invention are equally applicable to any fluid pressure operated brake system. Slidably received in this cylinder 10, is an air pressure operated piston for operating the air brakes, indicated at 12 and provided with the customary piston rod 14 which is preferably of hollow or tubular construction as indicated at 16 and which telescopically receives a brake actuating rack or ratchet bar 18 to which the piston rod is adjustably connected by a clutch unit indicated generally at 20. A spring (not shown) surrounding the piston rod 12 is used to return the clutch and other parts to the original rest position.

Suitably secured in any desired manner to the outer end of the operating rack 18, is a head 22 provided with a laterally extending integral adjustment arm 24 for a purpose to be later set forth. Likewise secured to the head 22 as by a pivot pin 26 is one end of a jack knife brake lever assembly consisting of an automatically operable lever 28 which consists of a member which is U-shaped in cross section, and whose outer extremity is pivoted as at 30 to a rod 32 connected in any suitable manner not shown to the brake rigging with which the adjusting device is associated. An inner brake lever 34 is secured to the lever 28 by the above mentioned pivot pin 30, and is oscillatingly received within the U-shaped lever 28. The other end of the lever 34 is connected by a chain or cable 36 to a hand wheel or similar mechanism for operating the brake rigging alternatively to actuation of the same by the automatic brake mechanism. Pivoted to the lever 34 adjacent its mid point, as at 38, is the bifurcated end 40 of a brake actuating rod 42 connected to other portions of the brake rigging with which the device is associated.

Figures 1, 9:
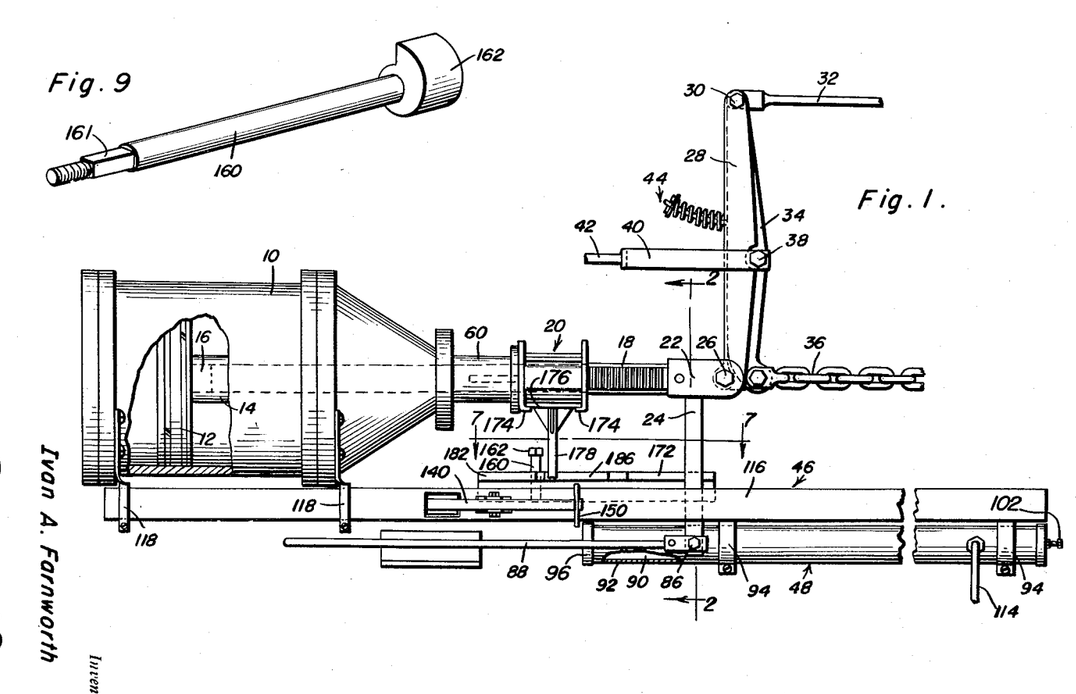
Figure 1 is a top plan view, parts being broken away to show the interior construction thereof, of a preferred embodiment of the invention.
Figure 9 is a perspective view of an element of the adjusting rack assembly.

As so far described, the arrangement is such that when air or other fluid pressure is applied to the left end of the piston 12 in the cylinder 10, the piston rod 14 and the associated operating rack 18 are moved towards the right, thereby producing a counter-clockwise motion of the jack knife assembly 34 and 38. This causes a motion towards the right of the brake rod 42 and a motion towards the left of the brake rod 32, thereby operating the associated brake rigging mechanism and applying the brakes. During this motion, the cable or chain 36 is slackened by movement towards the right of the lower end of the brake lever piston. As will readily be seen, as an alternative means of operation of the brakes, the cable or chain 36 may be tensioned by operation of a hand brake mechanism not shown, thereby drawing the cable 36 towards the right, and pivoting the lever 34 away from its receiving lever 28. During this movement, it will be seen that the lever 34 sets the brake rods 32 and 42 in the manner above described, but without however causing any movement of lever 28 and of the associated operating rack 18 and piston 12. Where found desirable, a spring means indicated generally at 44 may be employed for urging the levers 28 and 34 into their collapsed positions as shown in Figure 1.

It should be here noted that a customary conventional air brake system as employed on railway equipment, the brakes, rigging and levers are intended to be operated and fully applied by six inches of the piston travel of the air brake cylinder. Further, the standard air brake cylinder piston has an over-all travel of eight-inches. It will thus be apparent that in the system here described the first one and a half or two-inches is used to engage and disengage the clutch, while the last six-inches of the eight-inch travel is employed for gradually setting the brakes to their fully set position. With all of the brake rigging parts in proper position, it is evident that the desired relation between the parts may be obtained. However, as the brake shoes become worn, and as wear develops in the rigging, it will be evident that more or less slack will be produced. It therefore becomes necessary to readjust the operating linkage between the air piston and the brake rigging in order that the latter may be fully actuated within the desired operating range of travel of the air brake cylinder piston. This adjustment, as formerly performed manually, was both laborious and time consuming. For this purpose, the present mechanism has been provided for automatically shortening or lengthening the piston travel of the air brake cylinder with respect to the brake operating linkage in order to fully engage the latter throughout the six-inch operating range desired for the air brake piston and after the initial two-inches travel for taking up slack in the rigging. This mechanism includes the clutch indicated generally by the numeral 20, an adjusting rack assembly indicated generally by the numeral 46, a reaction cylinder assembly indicated by the numeral 48 and various associated mechanisms and elements to be subsequently set forth.

*Clutch assembly*

Figure 5:
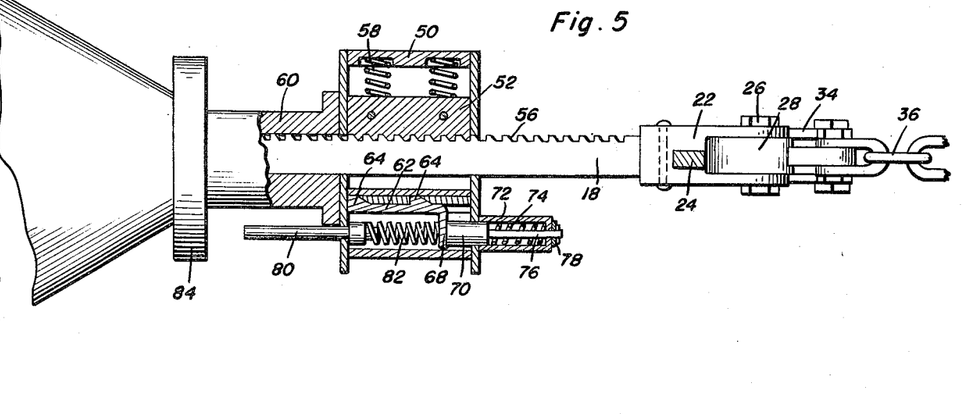
Figure 5 is a longitudinal vertical sectional view through the clutch and operating rack assembly, taken substantially upon the plane of the section line 5—5 of Figure 2.
Figure 6:
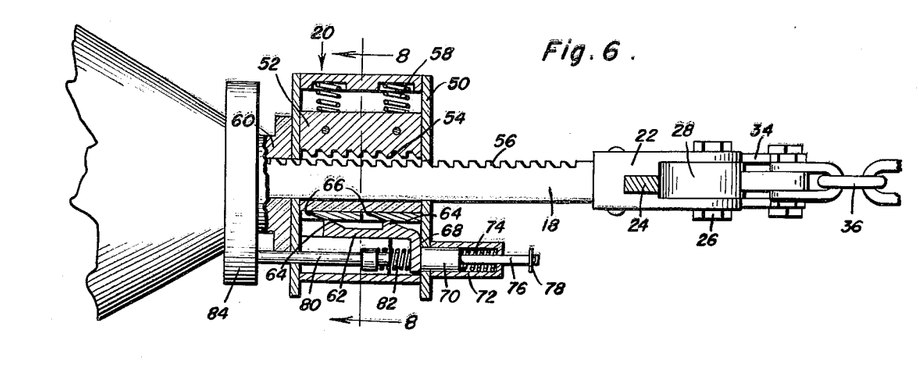
Figure 6 is a view similar to Figure 5 but showing the parts in the brake releasing position.
Figure 14:
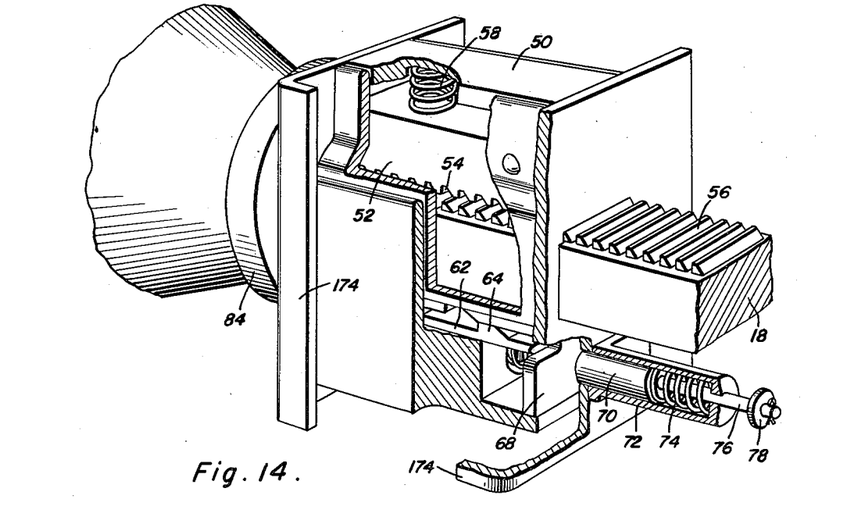
Figure 14 is a perspective view, parts being broken away, of the clutch unit of the device; and, Figure 15 is a perspective view, parts being broken away, of the cam plate mechanism and associated parts of the adjusting rack assembly.

Reference is first made to Figures 5, 6 and 14 for an understanding of the construction and operation of the clutch assembly. While the clutch assembly illustrated is understood to be preferable and highly satisfactory for the present device, it will be understood that the principles of the invention are not limited to any particular type of clutch, since various clutch constructions could be employed to give the requisite clutch action. There is provided a housing 50 of any suitable construction within which is guided for vertical sliding movement a movable jaw 52. The movable jaw 52 is provided with a transversely extending passage therethrough and the upper surface of this passage is provided with a plurality of teeth 54 which when the movable jaw is lowered, are adapted to engage corresponding teeth 56 upon the upper surface of the rack bar 18. As will readily be seen, the teeth 54 and 56 are positioned to engage and lock during outward movement of the clutch jaw, but to disengage or release during inward movement of the clutch jaw relative to the rack bar 18. A pair of springs 58 normally urge the sliding jaw 52 downwardly to locking position, while a cam means to be subsequently set forth raises the jaw into releasing position. It should be here noted that the housing 50 of the clutch assembly is rigidly carried by a connecting sleeve 60 which sleeve is freely slidable over the operating rack 18, and is connected in any suitable manner not shown to the end of the piston rod 14 for reciprocating movement therewith.

The rack bar 18 as above mentioned slides through a slot in the movable jaw 52 and also through openings in the end walls of the housing 50. A locking dog or slide 62 is slidably received in the lower portion of the housing 50 beneath the movable jaw 52, and is provided with a pair of locking lugs 64 which when disposed beneath the under surface of the movable jaw 52 urge the latter upwardly against the opposition of springs 58 to disengage the movable jaw teeth 54 from the rack teeth 56. However, when the slide 62 is properly disposed, the elevated portions 64 are receivable in recesses 66 in the lower surface of the movable jaw 52, thereby allowing the latter to drop downwardly under the influence of the springs 58 to thus cause the clutch teeth 54 to engage the rack teeth 56 and thereby lock the clutch housing 50 and hence through the member 60 the piston and piston rod to the operating rack 18.

The clutch dog 62 is provided with a downwardly extending plate 68 from one side of which extends a guide 70 disposed through the wall of the housing 50 and slidable in a guide bushing 72 whose outer end is closed to receive a spring 74 which urges the slide 70 inwardly of the housing. A rod 76 is secured to the end of the slide 70, extends through the spring 74 and through the end wall of the cylindrical guide 72 and is provided with a collar 78 which is adapted to abut the end wall of the bushing 72 to prevent further inward movement of the slide under the influence of spring 74. This latter spring serves to yieldingly urge the dog 62 into its innermost position, whereby the projections 64 are received in the recesses 66 thus permitting the movable jaw 52 to drop or move downwardly and engage the clutch teeth 54 with the rack teeth 56 as above mentioned. It will thus be seen that the spring 74 normally actuates the dog into position whereby the clutch spring 58 will cause the clutch to engage.

Means are provided for preventing the clutch engagement when the piston of the air cylinder is in its rest position or in its first two-inches of piston travel. There is provided a clutch dog actuating pin 80 aligned with the pin 76 and extending through the other end of the housing 50, this pin engaging one end of a spring 82 whose other extremity seats upon the clutch dog extension plate 68. The extending end of the pin 80 is of sufficient length to engage a suitable abutment surface such as that formed by the collar 84 on the end of the brake cylinder 10, it being understood that any other suitable abutment surface may be provided, and that if desired this abutment surface may consist of an adjusting screw for regulating the position of the abutment. The arrangement is such that the clutch dog pin 80 rests against this abutment and compresses the spring 82 when the air brake piston is at its rest position. The compression of spring 82 is sufficient to over-balance the spring 74 and urge the clutch dog 62 into its extreme right hand position as shown in Figure 6, thereby causing the clutch to remain disengaged. As the air brake piston on its actuating stroke moves toward the right, its first one and a half or two-inches of movement, of the piston merely moves the clutch housing 50, while the pin 80 remains stationary, the spring 82 expanding during this movement. After the requisite interim of travel have been completed, the tension upon the compression of spring 82 is sufficiently released to permit the spring 74 to force the dog 62 towards the left, until the dog projections 64 engage with a snap action the recesses 66, as shown in Figure 5, thereby permitting the springs 58 to engage the clutch member. From this point, the operating racking means is now rigidly locked to the air piston connecting rod and moves directly therewith. On the return stroke, the parts normally remain locked together until the pin 80 again engages the abutment surface 84, and on the last two-inches of the return stroke the dog 62 is shifted to the right by the increasing compression of spring 82 thereby disengaging jaw 52 from rack 18.

Reaction cylinder assembly

Figure 2:
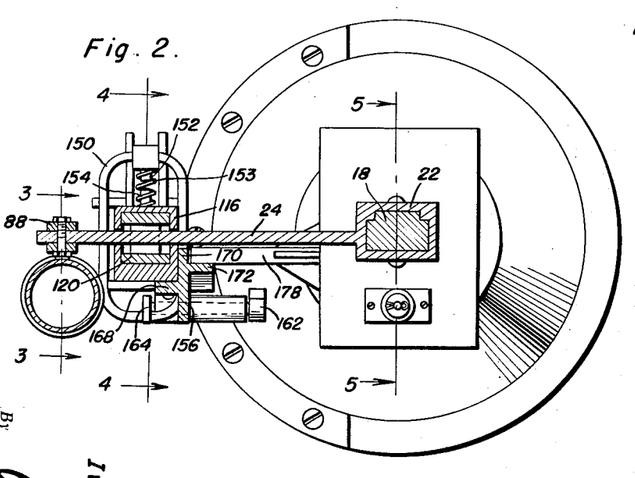
Figure 2 is a vertical transverse sectional view, upon an enlarged scale, through the adjusting arm of the device, taken substantially upon the plane of the section line 2—2 of Figure 1.
Figure 3:
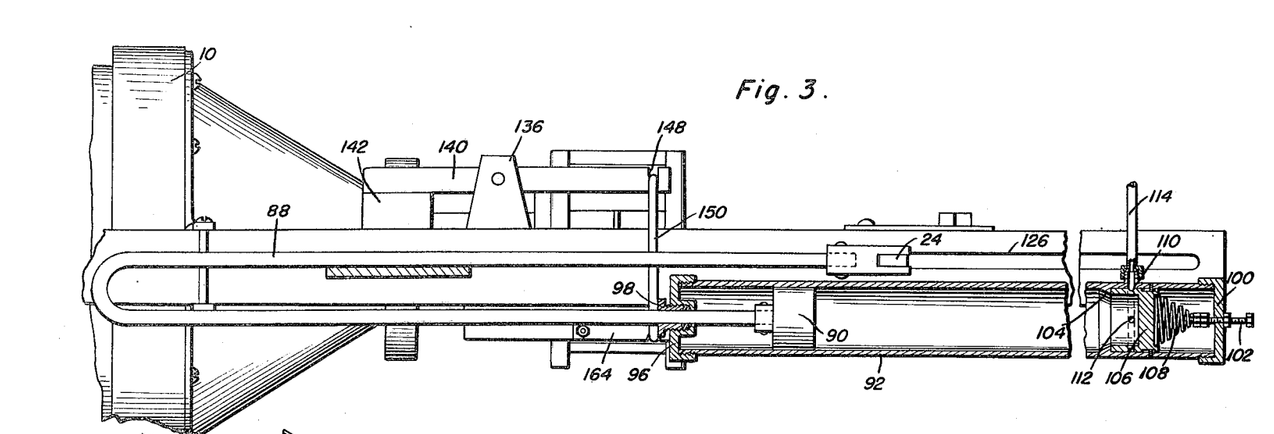
Figure 3 is a longitudinal vertical sectional view, taken upon an enlarged scale, parts being broken away and shown in section, through the reaction cylinder assembly, taken substantially upon the plane of the section line 3—3 of Figure 2.

Attention is now directed chiefly to Figures 1, 2 and 3 for an understanding of the construction and operation of the reaction cylinder assembly. The outermost extremity of the adjusting arm 24 is pivotally connected as at 86 to one end of a U-shaped connecting rod 88 whose other extremity has rigidly attached thereto a piston 90 slidably received in a cylinder 92 secured in any suitable manner as by brackets 94 to the adjusting rack assembly 46. The outer end of this cylinder 92 is provided with a removable end closure or head 96 through which slidingly extends the connecting rod 88 a suitable bushing 98 being provided for properly aligning the rod 88. The other end of this cylinder is provided with a removable closure 100 through which extends an adjusting screw 102 for a purpose to be now apparent. An internal rim or flange 104 is provided adjacent the outer end within the cylinder 92 to provide a stop or seat for a cup-shaped valve member 106, which is yieldingly urged to seating position upon the flange 104 by means of a spring 108 adjusted by the above mentioned adjusting screw 102. This valve member includes an annular peripheral groove 110 which communicates with the interior of the valve member as by ports 112, while the peripheral groove is in register with an air pressure line 114 extending through the side of the cylinder 92, when the valve is in its seated position. This line 114 is in communication with the pressure line supplying operating pressure to the air brake actuating cylinder 10.

The arrangement of this construction is as follows: With the parts in the rest position of the device, as shown in Figure 3, the air pressure of the brake system is supplied through pipe 114 and valve 106 to the interior of the cylinder 92, thereby urging the piston 90 and the connecting rod 88 towards the left end of the assembly. This pressure therefore through the adjusting arm 24 applies a constant minimum return pressure to the operating rack 18 and the associated parts of the apparatus. On the operating stroke of the piston, the adjusting arm 24 urges the reaction piston 90 inwardly of the cylinder 92, thereby further compressing the air within said cylinder and increasing the pressure within the reaction cylinder which urges the assembly to its original rest position. Upon the attainment of any predetermined pressure within the reaction cylinder, the valve 106 is moved outwardly against the pressure for which the spring 108 is adjusted, thereby breaking the connection with the pipe 114, trapping the air within the cylinder 92, and providing a dash pot effect. Of course, upon the return stroke of the piston 90, thereby permitting the dropping of the pressure within the cylinder 92, to the predetermined pressure at which spring 108 will permit the valve 106 to be seated, whereby the pressure within the cylinder 92 is again restored to its original value which is below that of the operating pressure maintained in the brake system for operating the cylinder 10 which is equal to the predetermined pressure at which spring 108 is set to operate.

Adjusting rack assembly

Attention is now directed to Figures 1, 2, 4 and 15 for an understanding of the construction of the adjusting rack assembly. This assembly indicated generally by the numeral 46 includes a cylindrical housing 116 which is mounted in any suitable manner such as by brackets 118 secured to the operating air cylinder 10. As shown best in Figure 2, the cylinder 116 is of square cross section and guidingly and slidingly receives an adjusting rack bar 120 therein. From in intermediate point to adjacent its outer end, the upper surface of this rack bar 120 is provided with rack teeth 122 for a purpose which will later become apparent. At its inner end, the rack bar is provided with a transverse elongated slot 124 which registers with a similar slot 126 formed in the side walls of the adjusting rack assembly housing 116. An intermediate portion of the adjusting arm 24 extends through the slots 126 and 124 whereby movement of the adjusting arm operates the rack bar 120 as set forth hereinafter.

Figure 4:
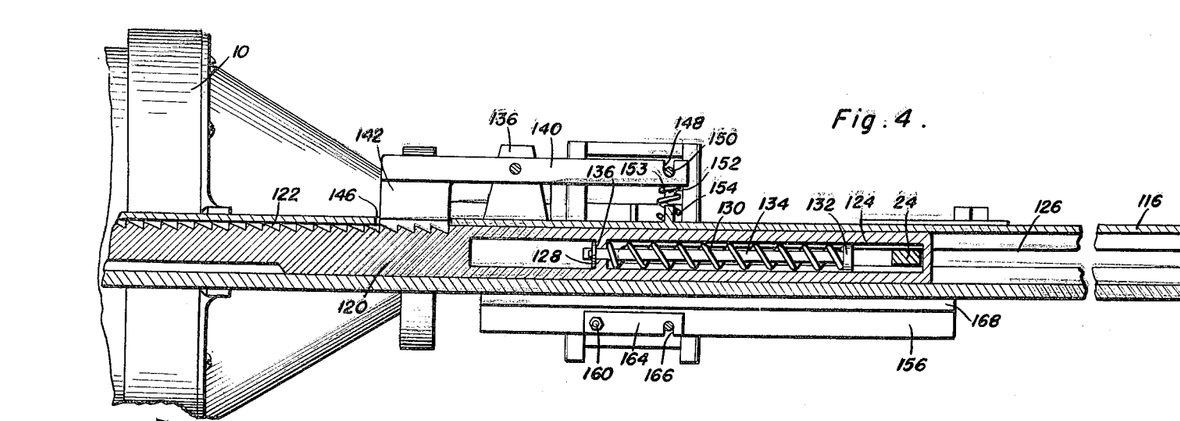
Figure 4 is a longitudinal vertical sectional view through the adjusting rack assembly, taken substantially upon the plane of the section line 4—4 of Figure 2.

As shown best in Figure 4, the slotted portion 124 is provided with a transverse web or partition 128 which constitutes one abutment of a spring 130 whose other extremity bears against the headed end 132 of a rod 134 whose outer extremity slidably extends through the partition 128 and is provided with a washer or collar 136 for limiting inward movement of the rod 134 under the action of spring 130. The arrangement is such that a slight lost motion is provided to permit a limited movement of the adjusting arm 24 between the end of the slot 124 and the headed end 132. Thus, as the operating rack 18 and the adjusting arm 24 move toward the right in Figures 1 and 4, the arm bears against the outer end of the slot 124 and because of the position of the teeth 122, which register with a latching means to be later described, the adjusting rack 120 is likewise drawn to the right. However, when the operating rack and adjustment arm 24 start to the left as the brakes are released, under the action of the free action cylinder assembly previously described, a certain lost motion occurs while the arm 24 moves through the clearance in the end of the slot 124 and until this arm contacts the headed end 132. The rack 120 is locked or latched, further lost motion of the arm 24 is permitted by the compression of the spring 130, between the partition 128 and the moving head 132 on the rod 134.

A latching means is provided for preventing rearward movement of the adjusting rack 120 under certain operating conditions of the device, and this latching mechanism consists of a pair of lugs 136 integrally or otherwise rising from the upper surface of the cylinder 116, and between which is journalled as by a pin 138, a latch 140. As will be clearly seen by reference to Figures 4 and 15, one end of this lever is provided with a downwardly extending jaw 142 provided with teeth 144 which are extensible through an opening 146 in the upper surface of the cylinder 116, whereby the toothed jaw 142 may be engaged with the teeth 122 of the rack bar 120, thereby locking the same against rearward movement. The other end of the lever is provided with a notch 148 in the upper end thereof, which notch receives a bail 150 which rests therein and loosely embraces the cylinder 116. Cooperating complementary stop pins 152 and 154 respectively are provided on the lower and upper surfaces of the latch member 140 and the cylinder 116 respectively, for limiting the disengaging movement of the latch jaw 142, and also to hold spring 153 used to keep the latch jaw 142 in locked position.

Figure 15:
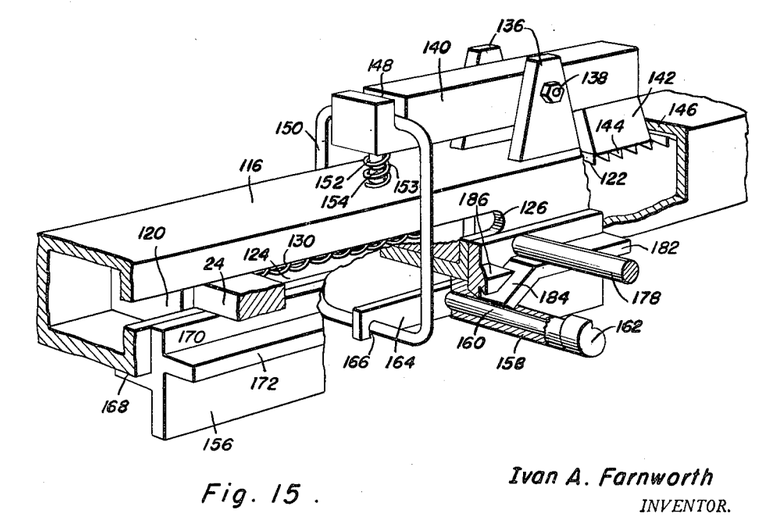

Secured to the side of the cylinder 116 is a plate 156 which is cruciform in shape as shown in Figure 15. Extending laterally from the plate 156 is a cylindrical boss or bushing 158 within which is journalled the shaft 160 having at its outer extremity an operating cam 162 and rigidly attached to its inner extremity upon a shouldered portion 161, see Figure 9, an actuating lever 164 provided with a notch 166 resting upon and engaging the lower end of the bail 150.

Preferably, the weight of the latch jaw 142 is such as to normally bias the latch into its locking position with the teeth 144 engaging the teeth 122; although as will be readily understood resilient means 153 may be provided for effecting this biasing action. It will thus be seen that the rack bar 120 may slide beneath the teeth of the latch member as the rack bar is moved towards the right in Figure 4, but that return movement of the rack bar is prevented until the latch is released by operation of the shaft 160 and the lever 164 and bail 150 by operation of the cam 162 by a mechanism to be subsequently described.

As will readily be observed by reference to Figures 2 and 15, the plate 156 has a horizontal lateral flange or rib 168 which underlies the bottom surface of the cylinder 116, while its upwardly extending rib 170 abuts against and is secured to the side of the cylinder 116. A laterally extending rib or flange 172 is provided upon the plate 156 and constitutes part of a cam track of a mechanism to be now described. Referring back to Figures 1, 8 and 15 and 14, it will be seen that the clutch housing 50 is provided upon one side with a pair of marginal inturned flanges 174 which comprise guide and retaining flanges for a slide 176 slidable vertically of the clutch housing. Extending laterally from this slide is an operating rod 178 which extends substantially to the vertical wall or flange 170 of the cam plate 156, and normally rides upon the cam surface 172 thereof.

It will thus be seen that the operating rod 178 is freely slidable vertically of the clutch housing assembly within the marginal guides 174; and has its end extending into close proximity to the cam plate 156, whereby the cam surfaces thereon as set forth hereinafter control the vertical position of the operating rod 178.

Figure 7:
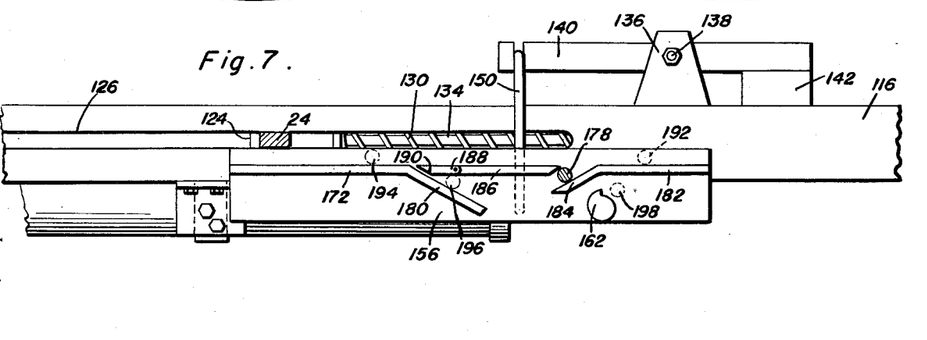
Figure 7 is a side elevational view of the cam plate and the adjusting rack housing, taken substantially upon the plane of the section line 7—7 of Figure 1.
Figure 8:
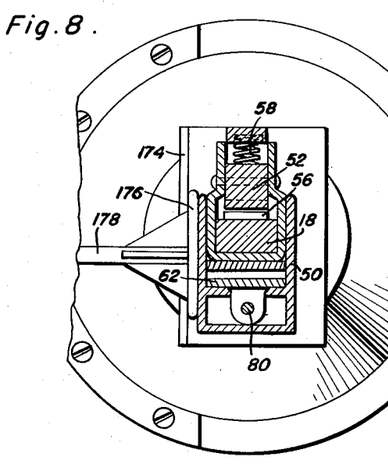
Figure 8 is a vertical transverse sectional view, taken upon an enlarged scale through the clutch housing assembly, substantially upon the plane of the section line 8—8 of Figure 6.

Referring now more specifically to Figures 7 and 14, it will be seen that the cam plate 156 is provided with a series of cam tracks, consisting of a laterally extending cam surface 172 which at one end is provided with a downwardly inclined ramp or run 180. Spaced from the track 172 and at the same level on the plate 156 is a second track section 182 which likewise is provided with a downward ramp 184 adjacent the incline 180. An intermediate track section 186 is formed on the plate 156 between the sections 172 and 182, this section having an end spaced from but overlying the incline 184 as clearly shown in Figure 7, while its other end has pivoted thereto as at 188, a movable end 190 which normally bridges the gap between sections 180 and 186.

The effect of these cam track sections upon the position of the operating rod 178 will be now described. Assuming the length of the brake operating mechanism to be properly adjusted, then with the air brake piston in its fully retracted position, and the brakes being fully released, there is indicated at 192 in Figure 7 the normal rest position of the operating rod 178, as it rests upon the upper surface of the track section 182. As now the air brake piston is operated and applies the brakes in their fully set position, the operating rod 178 moves along the track section 182, down the incline 184 beneath the end of the section 186, and then travels up the ramp 180 opening the pivoted terminal 190, and emerges upon the top of the track section 172 coming to its rest position 194 with the brakes fully set. When the brakes are released, and the air brake piston returned to its original position, the rod 178 travels along the section 172, over the bridge section 190, along with section 186, then upon the upper portion of the ramp 184 and so to its original position 192 upon the track section 182. This is the normal movement of the operating rod as the brakes are applied and released, with the brake mechanism being in properly adjusted position.

Figure 10:
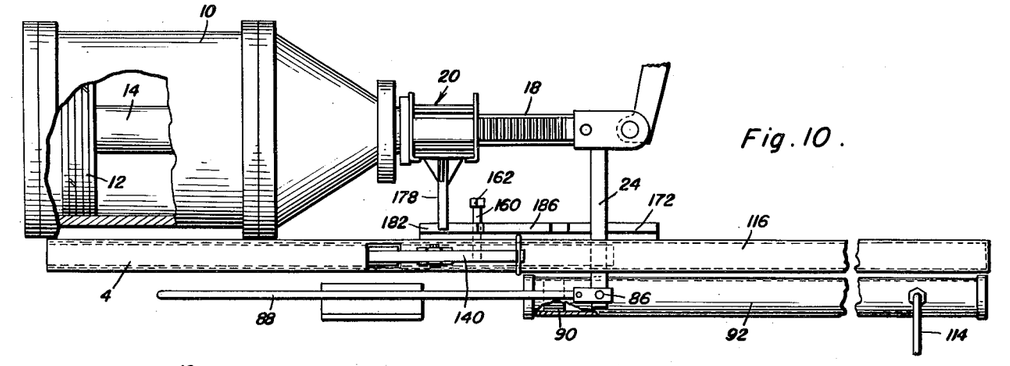
Figure 10 is a fragmentary top plan view, parts being broken away, showing the parts in the normal rest position of the device.
Figure 11:
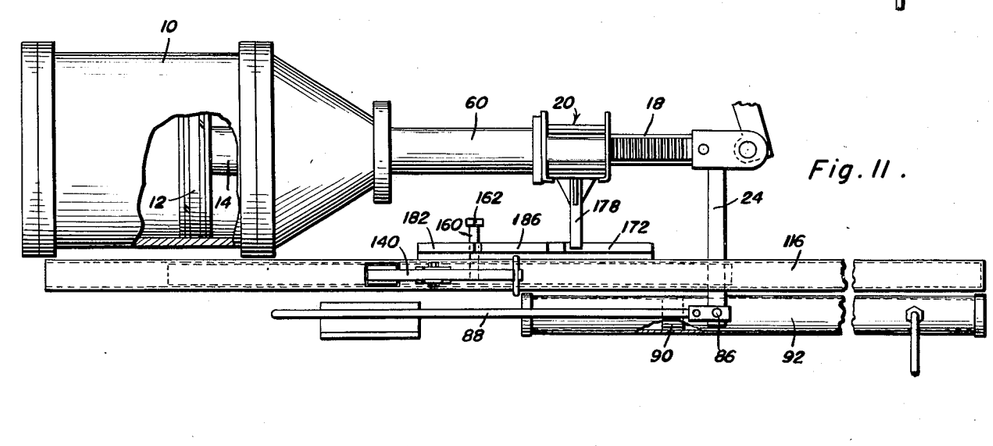
Figure 11 is a view similar to Figure 10 but showing the parts in the normal brake operated position of the device.
Figure 12:
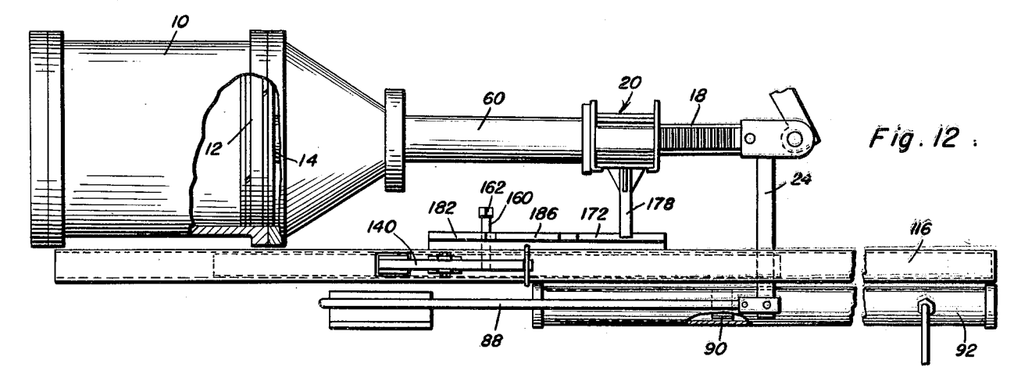
Figure 12 is a view similar to Figure 10 but showing the parts in the normal brake set position, with the air brake piston having too great a piston travel and the linkage being too short.
Figure 13:
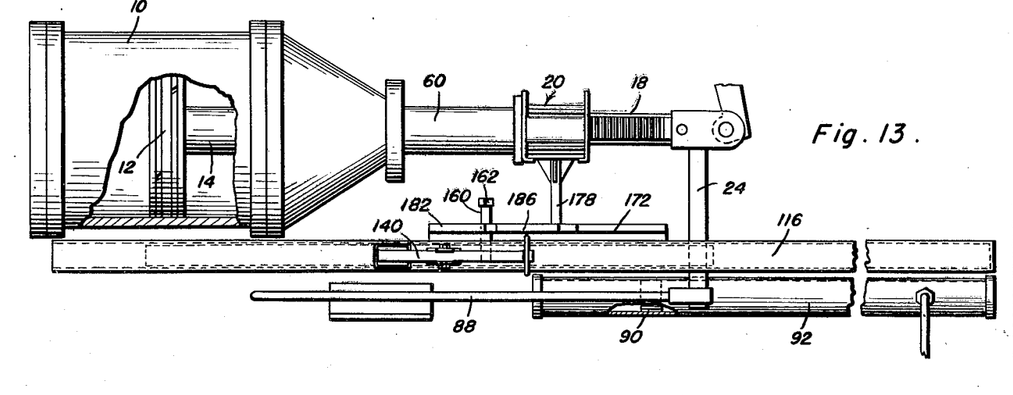
Figure 13 is a view similar to Figure 12 but showing the air brake piston having insufficient piston travel and the linkage being too long.

The normal rest position of the parts of the assembly are shown in Figure 10, while the normal position with their brakes fully set has been shown in Figure 11.

As wear occurs in the brake shoes and brake rigging, it will be evident that the normal piston travel of eight inches is no longer sufficient to take up the lost motion in the piston and fully set the brakes. It is therefore necessary to lengthen the brake actuating mechanism in order to compensate for the relative shortness of the system because of the introduction of slack therein as above mentioned.

The lengthening of the mechanism in order to shorten the piston travel to the desired eight inches is effected as follows: On the brake applying stroke, after the initial two inches of movement, the clutch member engages the operating rack and then moves the latter throughout the entire operating stroke of the air piston 12 until either limit of this stroke has been obtained or the brakes have been fully set. During this movement, the adjustment arm 24 has operated the reaction piston within the reaction cylinder to compress the air therein and build up a pressure for returning the parts; and has simultaneously drawn the adjustment rack 120 forwardly, the rack teeth 122 slipping under the jaw 142 of the dog 140, until the outermost position of the rack has been reached. Such readjustment of the rack 120 occurs a tooth at a time simultaneously with normal wear of the brake shoes. When now the air pressure is released upon the air piston 12, the pressure of the reaction piston 90 on the adjustment arm starts to return the parts to their initial position. However, movement of the adjustment rack is prevented by the engagement of the dog therewith, whereby continued return movement of the adjustment arm compresses the spring 130 within the adjustment rack, while returning the operating rack 18 and its associated mechanism. After about six inches of travel of the adjustment arm and associated mechanism, the spring 130 has been fully compressed, and thereby stops further inward travel of the adjustment arm and of the rack 18. At this point, the return of the air piston 12 to its original position under the emphasis of its own return spring, draws with it the connecting member 60 and the clutch assembly, which latter now rachets over the stationary operating rack 18, which movement is permitted by means of the one-way engagement of the clutch teeth and the teeth of the operating rack. This sliding movement of the clutch continues until the clutch assembly has approached within two inches of its rest position, whereupon the pin 80 engages the abutment 84 and by means of the compression of the spring 82 disengages the clutch jaws whereupon the clutch completes its last two inches of travel with the jaws released. Upon the next application of the brakes, the clutch housing moves two inches before the clutch engages, whereupon the next six inches of piston travel, of operating rack travel, and of adjustment arm travel merely serves to release the tension of the spring 130 by movement of the adjustment arm within the slot 126, without further movement of the adjustment rack. If, however, all of the slack of the piston is not yet taken up, movement of the air piston 12 beyond its normal eight inches of travel will again serve to draw the adjustment rack forwardly into a still more advanced position. The return stroke of the operating rack 18 is of course limited to six inches in the manner set forth hereinbefore. It will thus be seen that the adjustment rack serves to prevent a return stroke of the adjustment arm and the associating operating rack of more than six inches, this six-inches return stroke being permitted by the compression of the spring 130.

During the above described operation for lengthening the mechanism to compensate for wear in the system, the control rod 178 has moved upon the cam track surfaces of the plate 156 in the manner previously described, the amplitude of movement barely being greater than that of the normal eight inches of travel.

When however the brake shoes of the system are replaced, it is obvious that the increased thickness of the new shoes as contrasted with the excessive thinness of the old shoes render the adjustment prevailing in the brake mechanism such that the brake mechanism is too long, whereby less than eight inches of piston travel are permitted, since before the eight inches of travel had been reached the brakes by reason of the extra length of the linkage will be fully set. Obviously, in order to shorten the linkage and restore the desired standard travel, it will be necessary to reset the adjustment rack, and for this purpose the control rod 178 and associated mechanism is operable as follows: With the new shoes in place, and the linkage being too long, on the first application of brakes the operating rack 18, adjusting arm 24, reaction piston 90 are moved forward until the brakes are fully set, which will occur before the normal eight inches of travel have been effected. This movement is of course permitted by movement of the adjustment arm 24 in the slot 126 of the adjustment rack. During this setting of the brakes, the adjustment rod 178 has moved from its rest position 192, down the ramp 184, and upon the ramp 180. However, since the full eight inches of travel has not been attained, the adjustment rod will not reach its normal position 194, but will stop upon the incline 180 at a position such as 196, which is not sufficient to clear the pivot member 190. Therefore, on the return stroke when the brakes are released, the adjustment rod will move from the position 196 below the cam surface 186, below the incline 184, and will pass over the cam 162 reaching a rest position 198 therebeyond. On the next great operating stroke, the control rod will move from the position 198 into contact with the cam 162, and upon continuation of the outward travel of the control rod in response to the setting of the brakes, will rotate the cam and shaft 160, and operate to pull down on the bail 150 and release the latch 140. Upon releasing of the latch, which occurs obviously near the beginning of the brake setting stroke, the adjustment arm 24 has not yet moved sufficiently to fully release the compression of the spring 130, and accordingly the latter now throws or kicks the adjustment rack rearwardly. The completion of the brake setting stroke, will find the adjustment arm 24 at the forward end of the slot 126 in the adjustment rack, whereby the adjustment rack will again be drawn to its proper position for the new adjustment arm position. Upon the return of the parts to the rest position by the release of the brakes, the adjustment arm will travel six inches within the slot 126, compressing the spring 130 since the jaws of the dog 142 will again have engaged and locked the adjustment rack. Thus, it will be seen that the adjustment rack has been reset by the control rod and the operation of the adjustment arm to a proper position to permit a six inch stroke of the operating rack.

In drawing the mechanism back, the clutch pin 80 comes in contact with collar 84 before the rack assembly has traveled six inches. The clutch is thereby released and the rack bar 18 is pushed back into the hollow piston rod 14 to a new rest position.

It should be here noted that this automatic mechanism is therefore capable of extending or shortening the operating linkage in order to maintain a two-inch idle stroke of the air piston, and a six inch brake setting stroke making a total of eight inches of piston travel.

It will be further noted that at any time the brakes may be applied by the customary hand brake system without disturbing the setting of the automatic brake operating and adjusting means.

From the foregoing, it is believed that the manner of constructing and operating the device will be readily understood and further explanation is believed to be unnecessary. However, it is to be distinctly understood that the accompanying description and attached drawings are to be regarded as illustrative of the principles of this invention, and that numerous modifications and equivalents may be resorted to falling within the scope of the appended claims.

Having described the invention, what is claimed as new is:

1. In an air brake system which includes a brake operating air piston, a brake linkage, and an operating member connected thereto, a compensating mechanism connecting said piston and said operating member, said compensating mechanism including an operating rack connected to said operating member, a clutch assembly engageable with said operating rack and movable with said air piston, resilient means urging said clutch into engagement with said rack adjusting means for limiting the return stroke of the operating rack to a predetermined travel, resilient means for returning said piston from the terminal position of its operative stroke, independent means for returning said operating member from the terminal position of its operative stroke, means preventing operation of said clutch for a predetermined initial movement of said air piston, and an adjustment arm secured to said adjusting means by a lost motion connection permitting a lost motion substantially equal to said predetermined travel.

2. The combination of claim 1 wherein said adjusting means further includes a slide having rack teeth thereon and an elongated slot therein, said adjustment arm engaging said slot, and a dog engaging said rack teeth.

3. The combination of claim 2 including a resilient member in said slot interposed between said adjustment arm and said slide, and means responsive to predetermined variations in the length of the brake operating linkage for releasing said dog.

4. The combination of claim 3 wherein said last means includes a latch for withdrawing said dog, a cam for operating said latch and an operating rod carried by a part of said operating linkage for selectively operating said cam.

5. The combination of claim 4 including a guide member for said operating rod, said guide member having a first track for preventing engagement of said cam by said operating rod when the operating linkage is of normal length and a second track for causing engagement of said cam by said rod when said linkage is of abnormal length.

6. The combination of claim 5 wherein said operating rod is mounted on said clutch assembly for vertical sliding movement thereon.

7. In a fluid-operated brake system, automatically adjustable brake-operating mechanism including, in combination, a brake-actuating piston and cylinder assembly arranged for fluid operation; a connecting rod arrangement connecting the piston of said assembly with brake rigging of said system so as to apply the brakes on the power stroke of said piston and release the brakes on the return stroke thereof, said connecting rod arrangement comprising two independent rod members normally joined, by a ratchet coupling, as an elongate element rigid in the direction of brake application, one of said rod members fixedly carrying the said piston and a pawl in spaced relationship along its length, and the other of said rod members being connected to said brake rigging and being formed as a ratchet bar over which the said pawl is arranged to operate; a limit member fixed to the said other rod member; a positioning device engaged by said limit member, said positioning device embodying a carriage having spaced abutment members between which said limit member is positioned, the maximum spacing of said abutment members being substantially equal to the normal length of the brake-applying stroke of said other connecting rod member, said positioning device further embodying ratchet means permitting brake-applying travel of said carriage in company with said connecting rod arrangement beyond the corresponding abutting position of said limit member, but preventing similar movement of said carriage and said other connecting rod member in the opposite direction, whereby return travel of said other connecting rod member from any brake-applying position thereof is limited, in instances where the brake-applying stroke is normal or too long, to the maximum spacing between said abutment members; return means for said other connecting rod member; and independently operable return means for said one connecting rod member.

8. In a fluid-operated brake system, brake-operating mechanism arranged for automatically taking up slack due to wear in the brake rigging or for accommodating the installation of new brake shoes, to the end that the fluid-operated power stroke will be maintained at a substantially constant length, said mechanism including, in combination, a brake-actuating piston and cylinder assembly arranged for fluid operation; a connecting rod arrangement connecting the piston of said assembly with brake rigging of said system so as to apply the brakes on the power stroke of said piston and release the brakes on the return stroke thereof, said connecting rod arrangement comprising two independent rod members normally joined, by a ratchet coupling, as an elongate element rigid in the direction of brake application, one of said rod members fixedly carrying, the said piston and a pawl in spaced relationship along its length, and the other of said rod members being connected to said brake rigging and being formed as a ratchet bar over which the said pawl is arranged to operate; a limit member fixed to the said other rod member; a positioning device engaged by said limit member, said positioning device embodying a carriage having spaced abutment members between which said limit member is positioned, the maximum spacing of said abutment members being substantially equal to the normal length of the brake-applying stroke of said other connecting rod member, said positioning device further embodying ratchet means permitting brake-applying travel of said carriage in company with said connecting rod arrangement beyond the corresponding abutting position of said limit member, but preventing similar movement of said carriage and said other connecting rod member in the opposite direction, whereby return travel of said other connecting rod member from any brake-applying position thereof is limited, in instances where the brake-applying stroke is normal or too long, to the maximum spacing between said abutment members; return means for said other connecting rod member; independently operable return means for said one connecting rod member; a latch normally maintaining ratchet engagement of said ratchet means of said positioning device; latch-releasing means; actuating means for said latch-releasing means, said actuating means being arranged for response to movement of said one connecting rod member; guide means for said actuating means, said guide means being arranged to place said actuating means in operative position, on abnormally short brake-applying strokes of said connecting rod arrangement, for actuating said latch-releasing means on the next brake-applying stroke to effect ratchet disengagement; and propulsion means arranged to move said carriage in its normally locked direction upon release of said latch.

9. In a fluid-operated brake system equipped with the following: brake mechanism, a fluid-operated piston and cylinder assembly for activating said brake mechanism, and motion-transmitting linkage connecting said piston with said brake mechanism; an automatic piston-travel adjuster making up part of said motion-transmitting linkage, said adjuster comprising two elongate members arranged in overlapping relationship to form a variable length connecting rod for said piston, said piston being attached to one of said members, and said brake mechanism being attached to the other; a clutch fixed to one of said members and arranged to engage the other of said members in various lengthwise adjusted positions of one member relative to the other; a correction-measuring device embodying a travel-way of given length equal to the desired constant length of piston travel, said travel-way being defined by spaced abutment members; a travel member fixed to said brake-mechanism-attached connecting rod member and arranged for reciprocative travel along said travel-way of the corrective-measuring device as said connecting rod member reciprocates, said device being movably mounted; ratchet mechanism normally preventing movement of said device in the direction of return of said connecting rod and piston from a brake-applying stroke thereof while permitting movement thereof in the direction of said brake-applying stroke; and return means for said connecting rod members and piston.

10. The combination recited in claim 9, including, in addition, means for disengaging said ratchet mechanism; means responsive to excessively short brake-applying movement of the connecting rod and piston for actuating said disengaging means; and propulsion means operatively associated with the correction-measuring device for moving said device in its normally locked direction upon disengagement of said ratchet mechanism.

11. The combination recited in claim 10, wherein is provided positive clutch-release mechanism automatically operable at a given point on the return stroke of the connecting rod and piston.

12. The combination recited in claim 11, wherein the clutch is a pawl fixed to the piston-attached connecting rod member, and the brake-mechanism-attached connecting rod member is a ratchet bar arranged to be positively engaged by said pawl on the brake-appling stroke but to be slidable relative to said pawl on the return stroke.

IVAN A. FARNWORTH.

REFERENCES CITED

The following references are of record in the file of this patent:

UNITED STATES PATENTS

| Number | Name | Date |
|---|---|---|
| 556,011 | Macbeth | Mar. 10, 1896 |
| 753,650 | Wands | Mar. 1, 1904 |
| 790,493 | Fisher | May 23, 1905 |
| 996,284 | Schenck | June 27, 1911 |
| 1,749,018 | Campbell | Mar. 4, 1930 |
| 1,865,105 | Houplain | June 28, 1932 |